United States Patent [19]

Syracuse et al.

[11] Patent Number: 5,781,225
[45] Date of Patent: Jul. 14, 1998

[54] METHOD AND APPARATUS FOR IMPROVING ELECTRONIC RECORDING OF DEPTH IMAGES

[75] Inventors: Anthony A. Syracuse, Rochester; Donald Kent, Webster; Roy Y. Taylor, Scottsville, all of N.Y.

[73] Assignee: Eastman Kodak Company, Rochester, N.Y.

[21] Appl. No.: 885,217

[22] Filed: May 19, 1992

[51] Int. Cl.⁶ ........................................... B41J 2/47
[52] U.S. Cl. ........................ 347/258; 347/251; 358/298
[58] Field of Search ........................... 346/1.1, 108, 76 L, 346/107 R, 160; 358/298

[56] References Cited

U.S. PATENT DOCUMENTS

| | | |
|---|---|---|
| 4,109,262 | 8/1978 | Law . |
| 4,668,080 | 5/1987 | Gale et al. . |
| 4,768,043 | 8/1988 | Saito et al. ........................... 358/298 |
| 4,775,896 | 10/1988 | Umeda et al. ........................ 358/298 |
| 4,924,257 | 5/1990 | Jain . |
| 5,019,855 | 5/1991 | Lam . |
| 5,113,213 | 5/1992 | Sandor et al. . |

*Primary Examiner*—Mark J. Reinhart
*Attorney, Agent, or Firm*—Edward Dugas

[57] ABSTRACT

A system and method in which a size of a pixel used to print lenticular depth images is changed to remove overlap in the slow scan print direction. A space adjustment of the space between scan lines can also be performed to remove pixel overlap. The pixel can also be elongated in the fast scan direction reducing fast scan resolution. An elongated pixel can be combined with skip space adjustment to remove pixel overlap. Printing the image lines in the fast scan or dot movement direction improves image quality. The print resolution in the fast scan direction can be reduced by increasing the printing rate compared to the data rate of the supplied image data, thereby cloning pixels in the fast scan direction, while maintaining a normal slow scan speed to normally print lines. Combinations of the above approaches to directional printing, removing slow scan pixel overlap and reducing file size can be accomplished.

19 Claims, 7 Drawing Sheets

METHOD AND APPARATUS FOR IMPROVING ELECTRONIC RECORDING OF DEPTH IMAGES

CROSS REFERENCES TO RELATED APPLICATIONS

This application is related to U.S. Application entitled Method and Apparatus For Optimizing Depth Images By Adjusting Print Spacing having U.S. Ser. No. 07/885,705 and incorporated by reference herein.

BACKGROUND OF THE INVENTION

1. Field of the Invention

The present invention is directed to improving the efficiency of printing depth images with electronic film writers and, more particularly, to improving lenticular depth image print quality and efficiency by adjusting the print aperture along with recording in a preferred fast scan direction and/or controlling the printing operation to allow the print data file to be smaller in size.

2. Description of the Related Art

Electronic film recorders are designed to produce hard copy representations of electronic image files with image quality equal to or better than the photographic image quality resulting from optical printers and enlargers. These film writers can also be used to generate images intended for display with lenticular or barrier faceplates, thereby allowing them to be seen autostereo scopically, or with depth. However, we have discovered that the needs for good electronicallyprinted lenticular images are not the same as planar images.

Film writers like the Cymbolic Sciences International Fire 1000 and the Light Valve Technology (LVT) Incorporated Model 1620B by Eastman Kodak Co. are controlled by computers to generate lines of pixels (also known as scan lines) by affecting a relative motion between a microscopically small writing dot of light and the photographic media upon which the image from a computer file is being recorded. The light level in the writing dot is modulated in accordance with pixel data in the computer image file. Since the data which modulates the light levels is delivered out of the printer at the speed of the recorder's computer clock, this is also referred to as the fast scan direction. After each scan line of information has been written, the writing head or photographic media is translated relative to the other to a new scan line position parallel to the first and adjacent to it. This motion only occurs after a full line of data in the fast scan direction has been recorded and is referred to as slow scan direction motion. The convention used in planar image computer files is to establish an x-y grid of square pixels. The spatial density of pixels along the fast scan direction, and since the slow scan direction line density is nominally the same as the fast scan pixel density, is referred to as the print resolution. After exposure of the entire media area by the moving dot is complete, the photographic media is chemically developed to render the image visible.

As an expedient to rendering continuous tone areas of the image to appear without variations in density and color, the shape of the writing dot and the pixel density along the scan line are adjusted to provide some overlap in the exposure pattern in both the scan line direction and line progression or slow scan direction. This is facilitated by the fact that the light intensity within the writing dot approximates a Gaussian falloff from a central plateau region to the dot edges. If the overlap is correctly made, the integrated light energy will be substantially constant on all areas of the photographic media producing an area of constant tone values from the computer file. However, when this is not done well, artifacts of exposure density will be seen superimposed on the desired image in the final print. For example, if the mechanism moving the writing dot from scan line to successive scan line has a periodic error in physical displacement, the vertical stripe artifact seen is called banding and detracts from the appreciation of the original image. Banding effects as well as random errors can also occur along the scan line if the frequency driver of the writing dot light modulator is not constant, or if there are defects in the fast scan drive mechanism components. The designers of these systems have therefore taken care to minimize these effects for planar image prints. For example, the designers of the LVT system use a stepper motor with microstepper controls, such as made by Compumotor Inc., to linearly drive the optical head in a direction parallel to the axis of a revolving drum on which the print or transparency media is fixed, thus providing the slow scan motion. Control of the motor voltage driving the drum is performed in the LVT system by comparing the drum rotation speed with the data delivery reference clock through an error circuit, thus providing the fast scan motion speed control.

Lenticular prints made with film writers are similar to planar prints when seen from a particular perspective in front of the lenticular faceplate or overlay. Continuous tone areas of the scene should appear to have constant hue and density. However, when the eye is moved laterally, a new perspective image should be unambiguously displayed. This occurs because the lateral change of one fast scan line to the next is transformed by the geometry of a lenticule of the overlay to an angular change when projecting it into viewer space. If however, the second scan line has been printed with some overlap of the first scan line and subsequently with the third scan line, the information being projected for the second scan line angularly becomes ambiguously tainted by the first and third scan line information. At areas of the image where edge features are seen, this information will be seen as multiple edges, a condition called image stutter.

Another problem encountered by electronic printing of lenticular depth images is the composite print file size. In typical lenticular images the resolution of the projected image in the horizontal or slow scan direction is much lower than in the fast scan direction because slices of each image are interleaved in the horizontal direction to provide the depth effect and only one slice should be visible in any given lenticle from any particular angular location while the entire image is available in the vertical direction. The size of the typical composite print file for a 10 inch wide by 8 inch high image is 12200 lines by 9750 pixels, each pixel having three color values defining the color of the writing dot. As a result, the print file is typically 350 megabytes. Such large files require an excessive amount of time to print, resulting in slow image throughput. What is needed is a system that will reduce image ambiguity as well as the time required to print the image.

SUMMARY OF THE INVENTION

It is an object of the present invention to remove overlap in pixels in the slow scan direction to reduce image ambiguity in lenticular depth images.

It is also an object of the present invention to print image lines in the fast scan direction producing dot overlap in the fast scan direction to produce continuous tone image lines.

It is a further object of the present invention to elongate the pixel in the fast scan direction to reduce print file size.

It is another object of the present invention to consecutively reprint each pixel two or more times in the fast scan direction to reduce print file size.

It is also an object of the present invention to change the drive line for an aperture opening mechanism of a printer to elongate the pixel, thereby allowing reduction in print file size.

The above objects can be attained by a system and method in which a size of a pixel used to print lenticular depth images is changed to remove overlap in the slow scan print direction. The pixel can also be elongated in the fast scan direction reducing fast scan resolution and allowing the print file size to be reduced. An elongated pixel can be combined with skip space adjustment to remove pixel overlap in the slow scan direction and reduce print file size. The print resolution in the fast scan direction can be reduced by increasing the printing rate compared to the data rate of the supplied image data, thereby reprinting or cloning pixels in the fast scan direction, while maintaining a normal slow scan speed to normally print lines. Combinations of the above approaches to removing slow scan pixel overlap and reducing file size can be accomplished.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
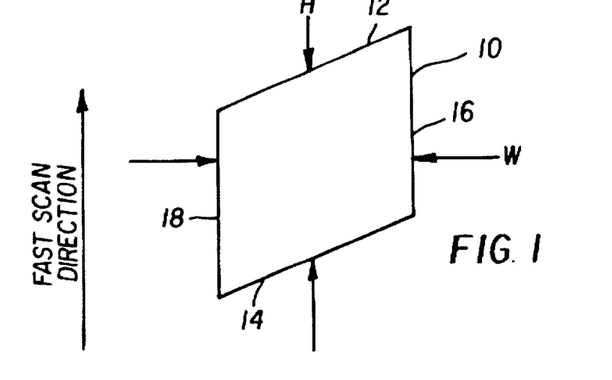
FIG. 1 characterizes a pixel of the preferred printer.
Figure 2A:
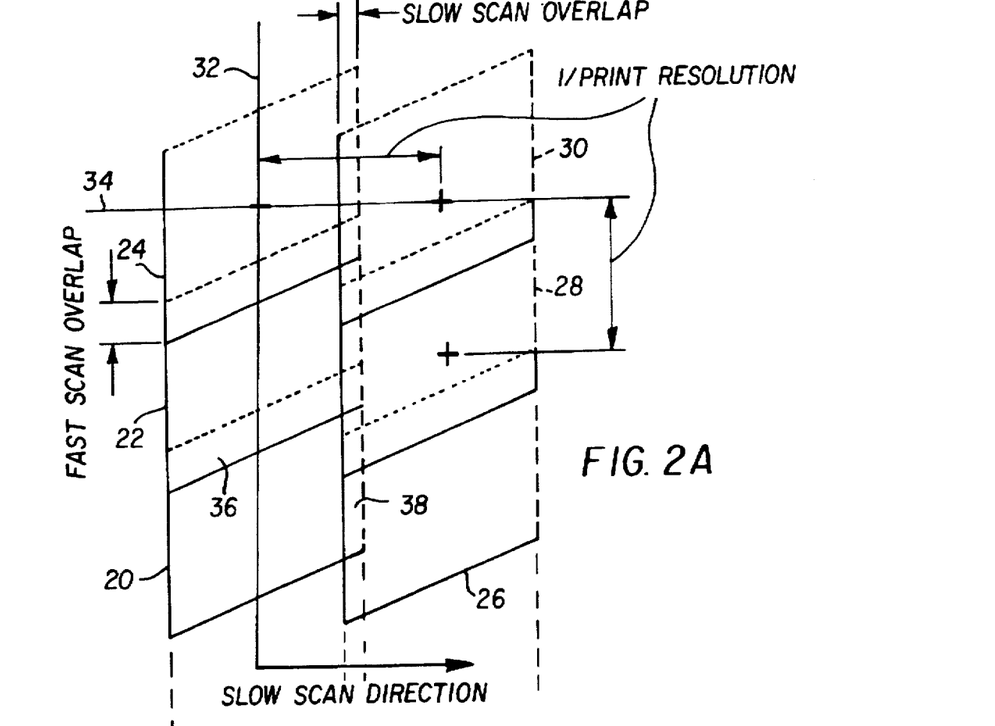
FIGS. 2a and 2b illustrate pixel overlap produced by the preferred printer when printing conventionally direct viewed prints.
Figure 2B:
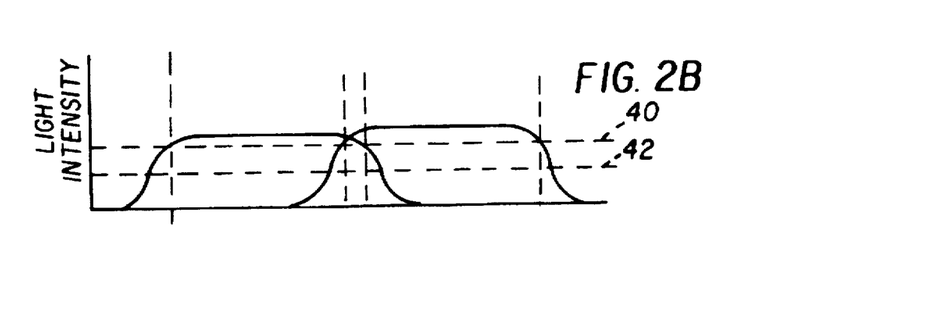

A characterization of a pixel 10 printed on a recording media using the preferred LVT printer previously mentioned is illustrated in FIG. 1. This pixel 10 is a parallelogram in which the top sides 12 and 14 are equal in length while the right and left sides 16 and 18 are equal in length. Typically, the top side 12 and bottom 14 sides are typically longer than the right 16 and left 18 sides, making the parallelogram pixel 10 into a rhomboid shaped writing do. The pixel 10 has a height H in the fast scan direction substantially parallel to sides 16 and 18 and a width W in the slow scan direction substantially perpendicular to sides 16 and 18 where typically H equals W. The size or effective diameter of the pixel 10 or writing dot in the preferred printer, as will be discussed in more detail later, is controlled by a mechanically adjustable aperture and the aperture is typically fixed at a desired opening in accordance with a standard print density calibration procedure utilized for planar density step images with areas of continuous tone value. FIG. 2a illustrates two printed scan lines of pixels 20–30 typically produced by the printer when the printed image is designed for direct viewing, such as in a conventional photographic print. Direct viewing is viewing a photograph without any lens system interposed between the print and the viewer, such as when a person looks at a snap shot print held in the hand. Each of the printed pixels 20–30 is produced by positioning a print media under the optical exposure system, modulating voltages applied to light valves and thereby transmitting appropriately colored light through the rhomboid shaped aperture. To create the next pixel, the print media, attached to a continuously revolving drum in the preferred printer, is moved along a scan line 32 or fast scan or scan line direction to another position at which time the light valves are subjected to new applied voltages, thereby changing the exposure. That is, during pixel motion in the fast scan direction the printing dot moves relative to the media while the light output is modulated. To print the next or adjacent scan line the printer head is moved a plural number of printer motor steps or microsteps to the next scan line position in a slow scan direction 34 perpendicular to the fast scan direction and across the revolving drum. During this slow scan direction motion the light valves are closed and no dot is produced. To create a smooth photographic print image (a continuous tone image) for direct viewing, the pixel size is designed to overlap in both the scan line direction, as shown by overlap area 36, and in the slow scan direction perpendicular to the fast scan direction, as shown by overlap area 38. When a depth print recorded using the conventional overlap pixel spacing is viewed through a lenticular overlay, that is, not viewed directly but placed in contact with the planar side of an array of cylindrical lenses of focal lengths substantially equal to the thickness of the overlay, the pixels in adjacent scan lines from different views in the slow scan direction 34 cause an effect called image stutter or ambiguity which reduces the quality of the images created by the lenticular overlay. To reduce this effect it is desirable to space the scan lines of different views or image lines apart by an appropriate distance or to reduce the width W of each pixel so that the pixels do not overlap, that is, the overlap 38 is reduced and ultimately disappears. The overlap 36 in the scan line direction 13, however, is desirable to maintain the planar effect of a view scene. The overlap 36 in the scan line direction is, however, desirable. FIG. 2a shows the edges of the pixels to be sharp when in fact, as illustrated in FIG. 2b, the edges are not sharp because of optical diffraction effects in the printer. The edge of each pixel is commonly designated by the printer manufacturer as some percentage of full intensity as depicted by the dashed line 40 of FIG. 2b. To remove any overlap it is necessary to either space the pixels far enough apart or change the width W in the slow scan direction 34, so that the light intensity has fallen below a predetermined threshold, such as an activation threshold 42, of the print media, as illustrated by dashed line 42. The activation threshold 42 is the lowest light intensity level at which a chemical change will occur in the media due to radiation exposure. This activation threshold 42 varies from media to media requiring that the spacing between or width of scan lines of adjacent image lines either be variable or that the spacing be some arbitrarily large distance or the width some arbitrarily small width sufficient to prevent overlap. This spacing, as will be discussed later is accomplished by either adjusting the width W of the pixels or adjusting the number of steps or the distance moved between scan lines, in the slow scan direction 34, by the printer head.

We have discovered that image stutter in depth images can be reduced when using the preferred LVT recorder by reducing the writing dot diameter (reducing both width and height), thus reducing or eliminating pixel overlap. However, this creates a problem with using the standard density calibration procedure because the procedure uses a planar density step image with areas of continuous tone values. Another problem results in that without overlap the areas of continuous tone values along the fast scan direction also become subject to Gaussian level falloffs, resulting in reduced image quality because of noticeable variations in density where none were expected.

Figure 3A:
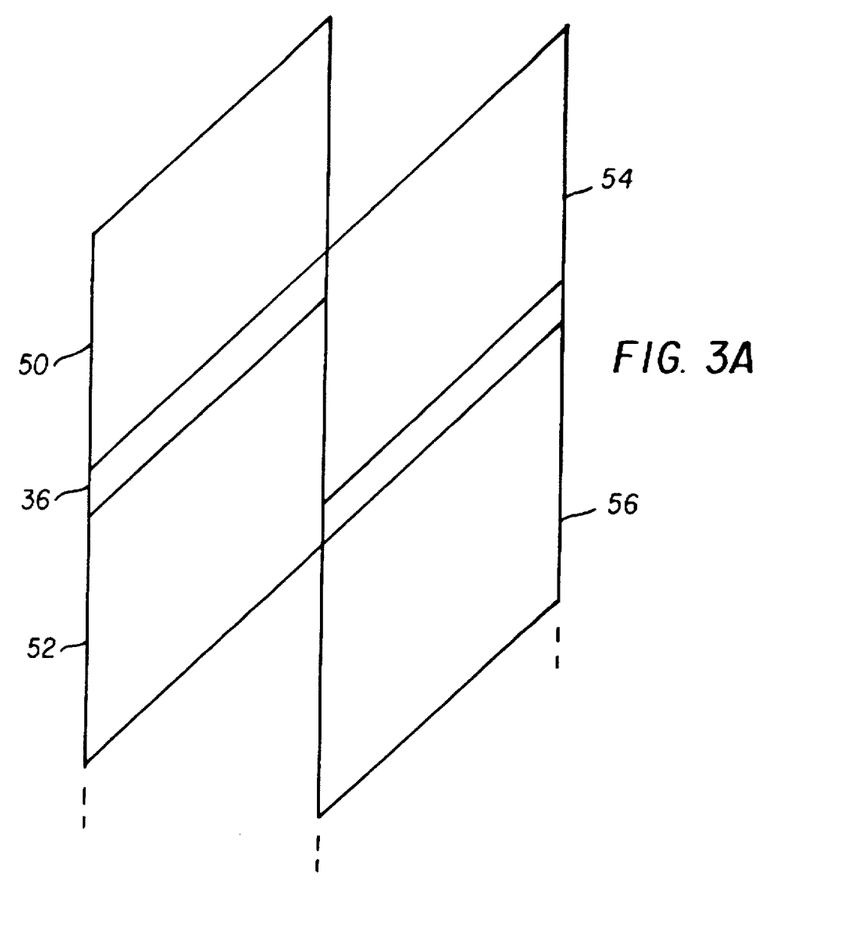
FIG. 3 depicts pixels with slow scan overlap removed.
Figure 3B:
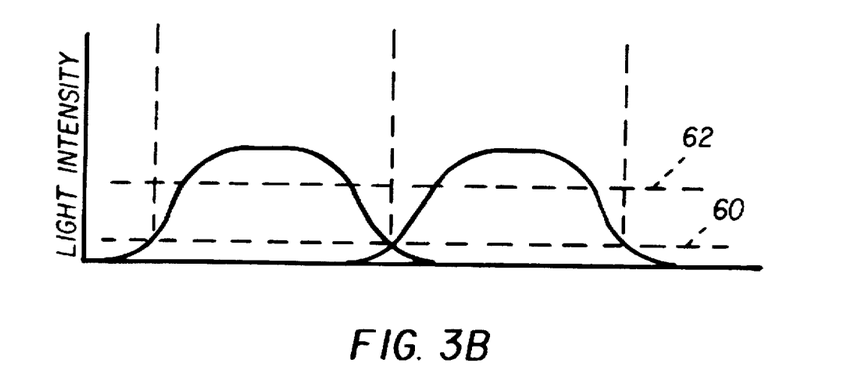

FIGS. 3a and 3b illustrate pixels 50–54 of adjacent scan lines in which the width of each pixel has been adjusted to remove the overlap area 38 while the overlap area 36 has been maintained. This prevents the Gaussian falloff in the fast scan direction and removes the overlap that causes image stutter. The width adjustment has resulted in pixel edges as defined by the activation threshold 60, that abut or touch each other. It is preferred that no unexposed media exist between scan lines. The edge of the pixel is defined in the present context as below the arbitrary level used to define the pixel in the normal print operation. A pixel with the slow scan overlap removed, such as by changing the width W of the pixel or by inserting space between the pixel in the slow scan direction, is the type of pixel preferred for use in depth images such as lenticular prints.

Figure 4A:
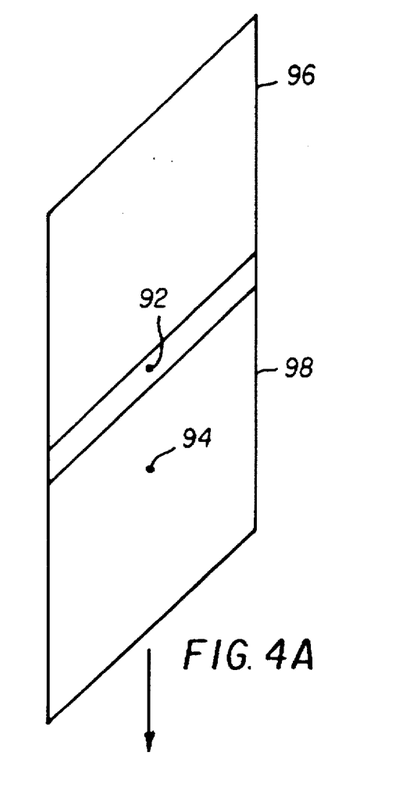
FIGS. 4a–4d illustrate overlap in the fast scan direction.
Figure 4B:
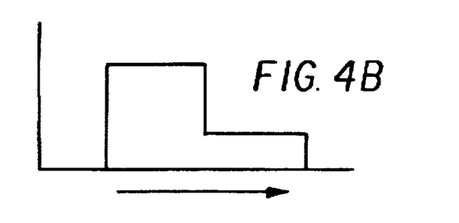
Figure 4C:
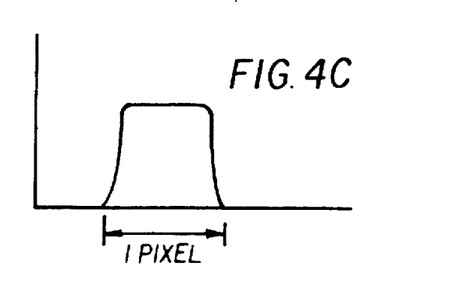
Figure 4D:
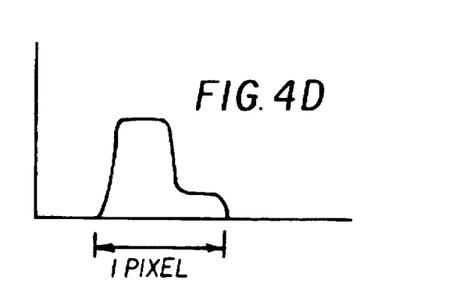

When pixels are being recorded by the preferred printer a pixel clock, to be discussed in more detail later, controls when the voltages across light valves regulating the amount of light passing through an aperture are changed. The light valves do not react instantaneously and the recording media is moving during the change in light level. Once the desired light level is reached, the level is substantially constant as the illuminated aperture traverses a distance on the recording media equal to a pixel size in the rotational direction of the drum, that is the fast scan direction. For maximum sharpness or resolution the ideal situation would be to have an aperture that has no height in the fast scan direction, so that a step change in exposure could be provided as the aperture relatively moves from one pixel location to the next in the fast scan direction. When creating continuous tone images it is desirable to have pixel smear or overlap, especially in the fast scan direction, so that the resulting image is pleasing to the eye. It is also necessary to have some finite height to the recording spot (or aperture), so that the intensity of the spot can be integrated over a finite length of time. As a result, each infinitesimally small area of the media or the grain of the media emulsion will see a variable intensity over time that is made up of the values for two adjacent pixels adjacent in the fast scan direction. For example, as in FIG. 4a, assume that two infinitesimally small regions 92 and 94 on a media are being exposed, that pixel 96 is the position of the recording spot at the beginning of the first pixel, that pixel 98 is the position of the recording spot at the beginning of the second pixel, that the relative movement of the spot with respect to the media is in the direction of the arrow and that FIG. 4b depicts the pixel values of pixel 96 and 98. Point 92 will be exposed almost entirely based on the pixel period for pixel 96 as illustrated in FIG. 4c as the spot moves from position 96 to position 98. Point 94 will receive a mix of intensity over time from both pixel light levels as depicted by FIG. 4d. As a result, the photographic density achieved at points 92 and 94 will be different. This overlap is inherent to an image recorded with finite spot height in a fast scan direction where the dot and the media continuously move with respect to each other. This overlap is in addition to the Gaussian falloff illustrated in FIG. 3b. No such inherent overlap occurs in the slow scan direction, only that intentionally created by having the spot width be wide enough so that the Gaussian falloffs intersect. As a result, it is important to have the fast scan direction for lenticular images be aligned and not at right angles to the lenticules (cylindrical lenses) that define which view is transmitted to each eye of the observer. If such alignment is not provided the view ambiguity created by the fast scan overlap will detract from the depth effect of the final image.

Figure 5:
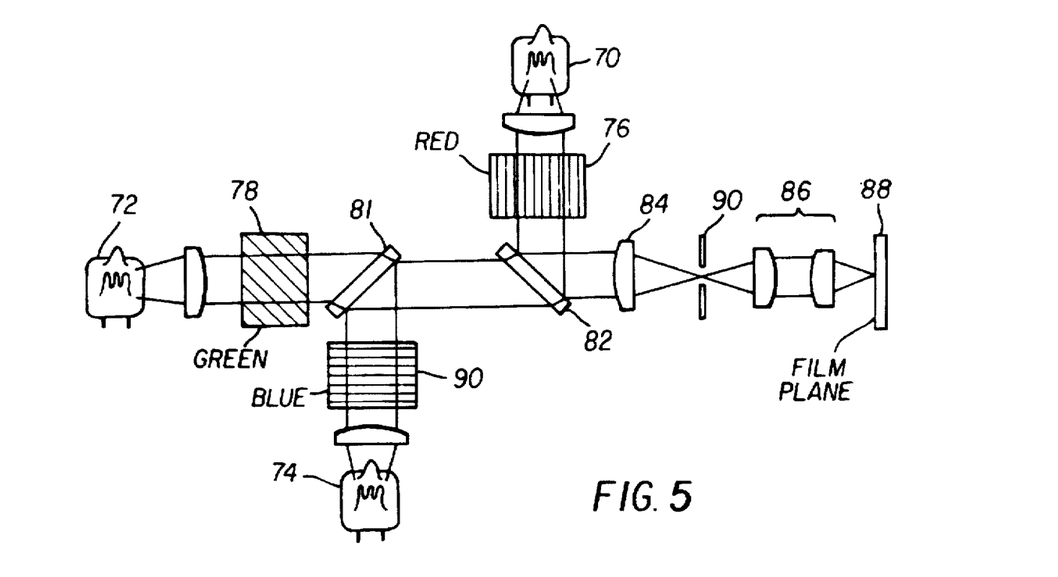
FIG. 5 depicts optical components of a printer.
Figure 6:
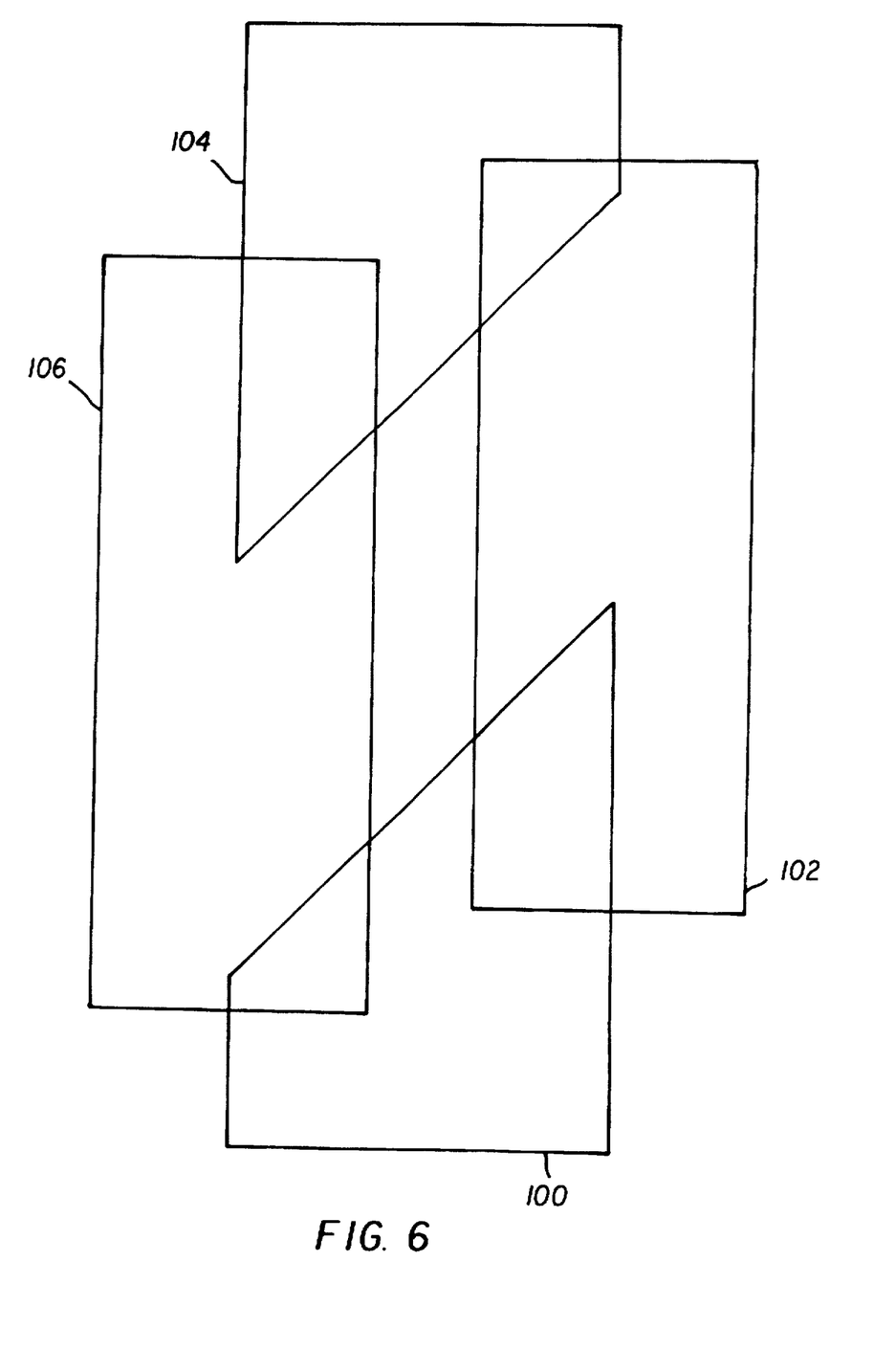
FIG. 6 illustrates an aperture control mechanism.

FIG. 5 illustrates the optical schematic of the optical head of the preferred printer. Light sources 70–74 with filtered light valves 76–80 produce modulated colored light which is combined by mirrors 81 and 82 and projected through a light condenser 84 and a microscope objective 86 onto the print media 88. The shape and size of the writing dot is determined by aperture 90 which is overfilled by the light transmitted by the light condenser 84. The aperture 90 can be constructed from individually movable plates 100–106 as shown in FIG. 6. FIG. 6 illustrates an aperture which creates a pixel with a 1:4 aspect ratio where the height is four times the width. Each of the plates can be individually, mechanically adjusted in position to allow aspect ratio and pixel size changes. However, typically the plates 100 and 104 are adjusted simultaneously to affect height changes while the plates 102 and 106 are adjusted simultaneously to effect width changes.

When a lenticular image is displayed by the lenticular faceplate and viewed from just one eye location, each lenticule appears to that eye to be flooded with information from just one scan line from that lenticule. Consequently, when viewed as an area device, the horizontal resolution is limited to the spatial density of lenticules. In the fast scan direction, the (vertical) resolution is not similarly affected by the optics, but is equal to the pixel printing resolution. As an example, if 24 slow scan lines are printed for each lenticule, then the result is that the final picture has 24 times as much vertical resolution as horizontal resolution. It has been found by us that a reduction in fast scan resolution (vertical resolution) to approximately $\frac{1}{5}$ to $\frac{1}{3}$ times slow scan (horizontal) resolution in lenticular prints maintains a high sense of image quality. A pixel aspect ratio range of width to height of 1:5 to 1:3 has been found acceptable. The fast scan resolution becomes 2 to 4 times greater the lenticular density. This also allows fast scan data line length and file size to be reduced by a similar ratio.

Figure 7:
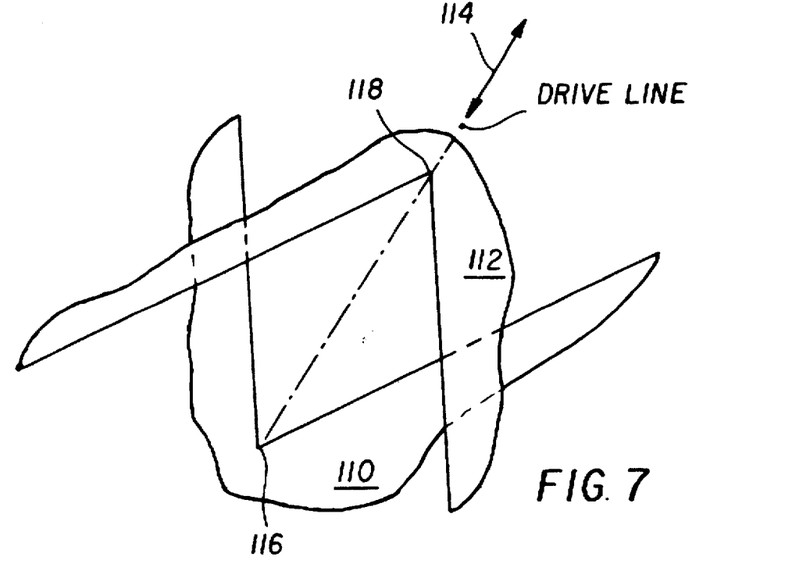
FIG. 7 illustrates another aperture control mechanism.
Figure 8:
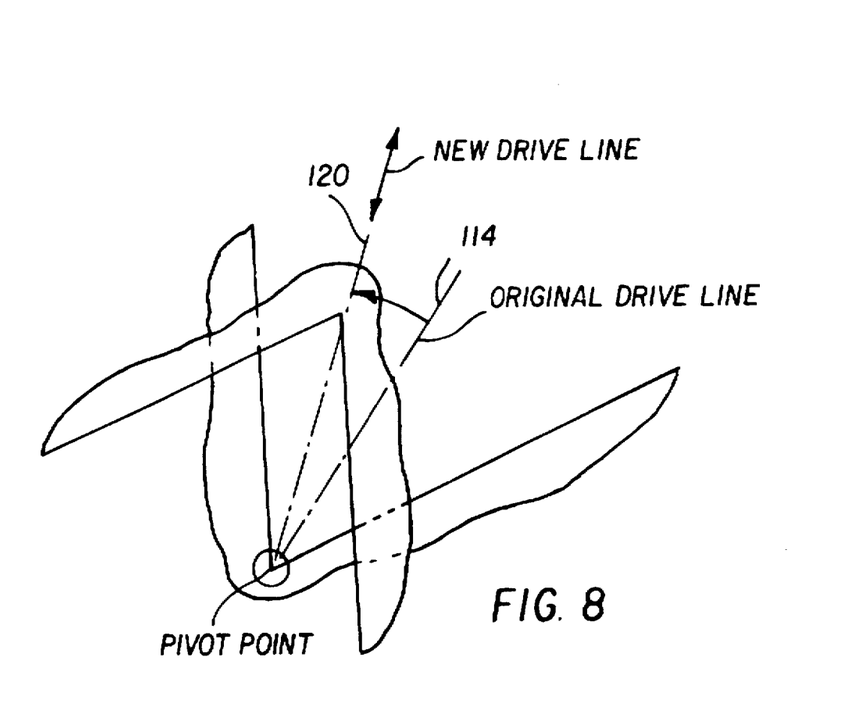
FIG. 8 illustrates a drive line change for the mechanism of FIG. 7 to obtain a pixel with a different aspect.

The aperture of the preferred printer is illustrated by FIG. 7. Aperture size is governed by the position of two notched plates 110 and 112. Size changes are effected by producing relative motion between the plates 110 and 112 along the drive line 114. When the corners 116 and 118 of the plates 110 and 112 are moved toward each other by the drive mechanism, the pixel dot size is made smaller while when the corners 116 and 118 are moved apart the dot size increases. The aspect ratio of the pixel remains constant during such size changes. FIG. 7 illustrates how the shape of the pixel can be changed to create different width and height pixels by rotating the original drive line 114 to a new drive line 120. This rotation can be by a manual mechanical adjustment or using stepper motors. By opening and closing the aperture along this new drive line 120, a constant pixel aspect, different from the aspect produced by the drive line 114 of FIG. 7, can be maintained while changing the size of the pixel. Rotation of the drive line to other positions can be used to obtain pixels with different aspect ratios and thus different width to height sizes. As the size of a pixel changes, in the preferred printer, the light valves automatically control the amount of light transmitted through the aperture based on data created during the calibration operation.

Because the optical head on the preferred printer illustrated in FIG. 5 is removable, interchangeable optical heads could be provided with different pixel aspect ratios, allowing the printer to be quickly converted to printing lenticular images as desired without manual adjustment.

With a pixel having a four to one aspect, as illustrated by FIG. 6, the print data in the scan line direction can be compressed by a conventional compression methods, such as pixel undersampling or averaging to create, in the vertical direction or fast scan direction, a print file which is one fourth the size of the original file. The resolution or number of steps between pixels in the fast scan direction must be changed to accommodate the elongated pixel.

Figure 9:
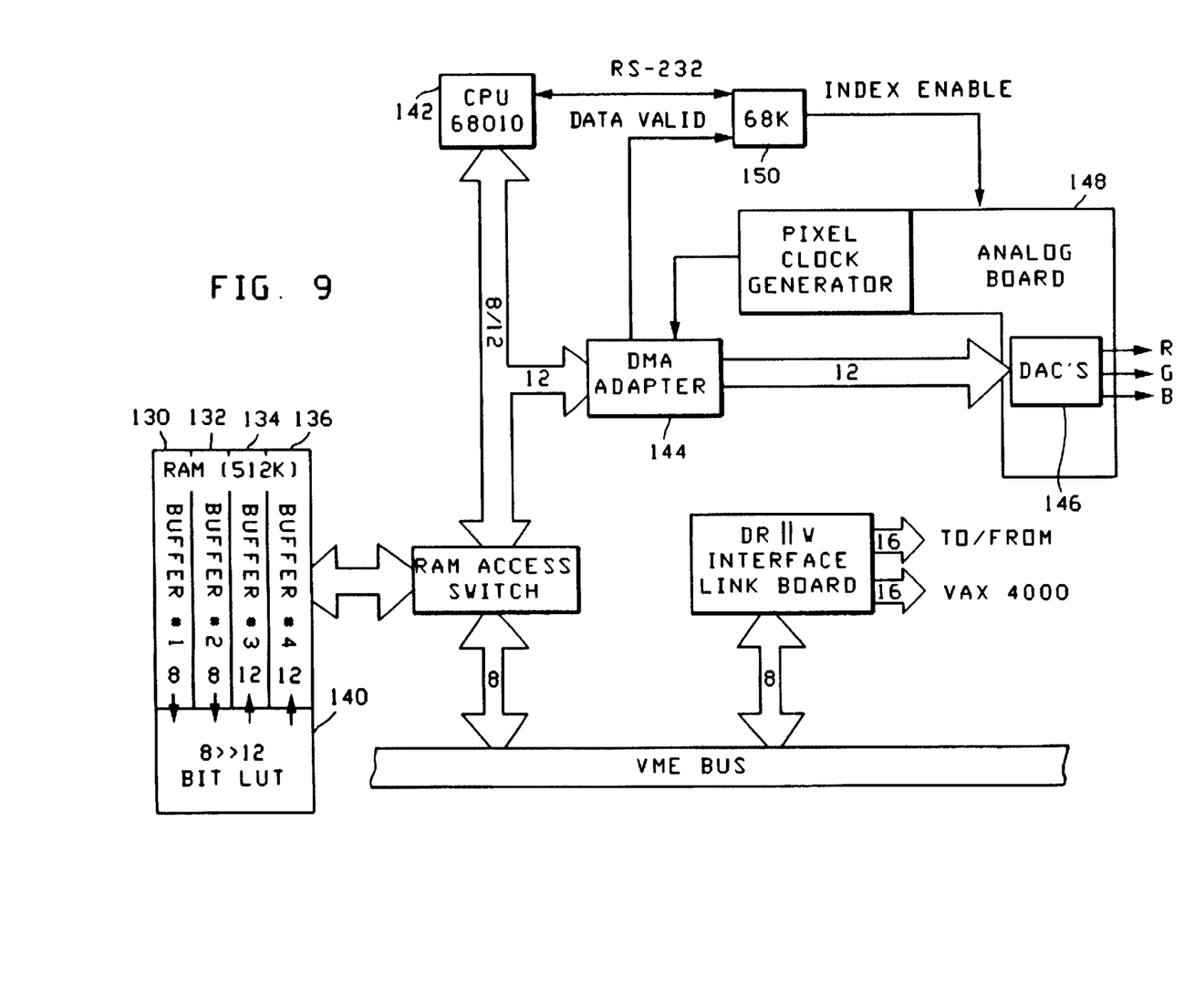
FIGS. 9 and 10 illustrates the components of the preferred printer that can be used to provide different fast and slow scan print resolutions.

The data delivery architecture of the preferred printer is illustrated in FIG. 9. This architecture allows maintaining of the writing dot overlap in the fast scan direction while introducing writing dot separation in the slow scan direction by recording different print resolutions in the two directions. Changes to the utilization of the components of the preferred printer to allow dual resolution printing will now be discussed. Two buffers 130 and 132 store 8 bits of color/pixel input data representing the desired final image density and two buffers 134 and 136 store 12 bits of color/pixel data used to drive the light modulating circuits. An 8 bit to 12 bit lookup table 140 is used to convert the input data to driver data for the type of film being used to allow for variations in the print process, such as print drum speed. A CPU 142 controls data path directions and allows a direct memory access interface 144 to replace data applied to three digital to analog converters 146 of the analog board 148 of the printer with new data alternately at the desired appropriate times from buffers 134 or 136. That is, the computer can supply pixel data at any ratio desired to the adapter 144. If data is supplied at half the pixel printing rate the same data will be used twice, that is, two identical pixels will be printed. The data applied to converter 146 is converted into voltage signals which in turn modulate the light levels delivered from the three light sources 70–74. Using multiple buffers 134 and 136 allows the source of image data to be asynchronous with respect to the pixel clock 150 shown in FIG. 9. The printing data rate within the film recorder is faster than the data rate of the supplied image data, so that an empty line buffer 134 or 136 is available when needed for loading. During operation one buffer is being loaded while the other is being read out for controlling light density. That is, with normal printing the new line information is alternately taken from buffers 134 and 136. The pixel clock stops when the end of the film being recorded ends and the head is positioned to a new position during the clamp space on the drum. An output from a drum encoder 160 is used to start the pixel clock again. The data delivery rate through adapter 144 to the converters 146 is established by the pixel clock generator 150 and is synchronized to the drum rotation by the drum encoder 160 illustrated in FIG. 10.

Figure 10:
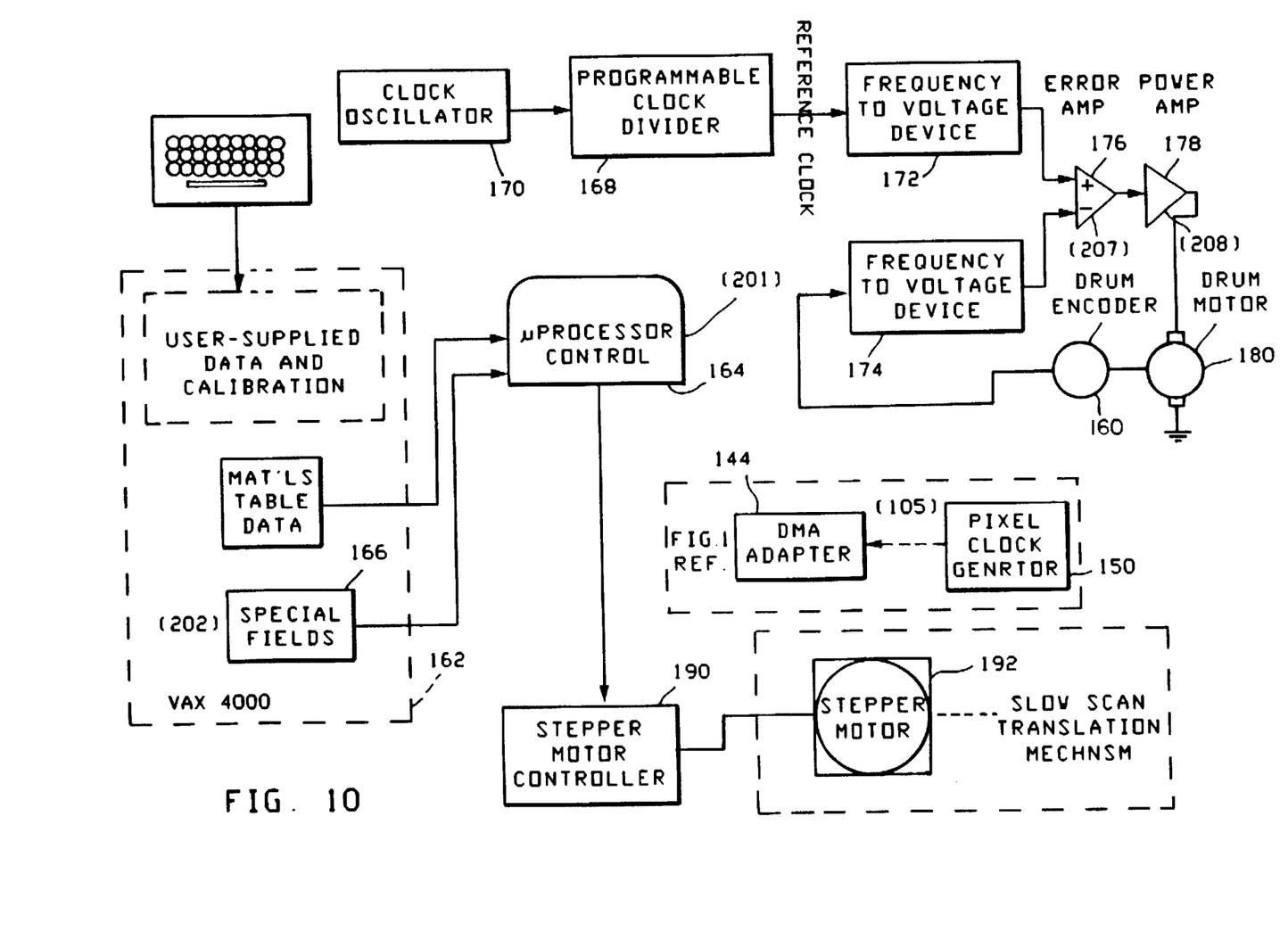

FIG. 10 illustrates the system components of the preferred printer which coordinate the speed of the drum (fast scan speed) and the optical head (slow scan speed). To establish the correct drum speed a system controller computer 162, in particular the VAX 4000, sends a zero drum speed command to the microprocessor control unit 164 of the printer. When the microprocessor 164 sees this value, it defaults to a table value in the computer 162 for drum speed (in addition to light level adjustment information for printing resolution and material type). The microprocessor 164, responsive to the resolution, drum speed and light level, sends a signal to a programmable clock divider 168 which subdivides the clock oscillator 170 reference to lower frequencies. This lower frequency is in turn converted into a voltage by a frequency to voltage conversion unit 172. The voltage produced in accordance with the speed command is compared to the voltage produced in accordance with the encoder 160 output by unit 174 by a comparator or error amplifier 176. The output voltage from the amplifier 176 is applied to power amplifier 178 to generate a speed correction voltage sufficient to accelerate the drum motor 180 to a new angular velocity. The drum encoder 160 is also used by the pixel clock generator 150 to deliver data to the optical head at the correct rate for the printing resolution specified by the operator using the computer 162. The pixel clock is frequency and phase locked to the drum encoder output. The pixel clock can be programmably divided down to a desired clock rate, allowing the data rate to be changed for the same drum speed, thereby allowing a pixel of a different size or shape to be used. As a consequence the number and size of pixels printed per fast scan line is not affected by drum speed. Typically when drum speed doubles the light level in the preferred printer also doubles. The motion of the optical head is also controlled by microprocessor 164. A stepper motor controller 190 receives a signal from the processor 164 indicating the number of steps desired between scan line positions. That is, the number of steps equivalent to the printing resolution established by the computer 162 for the image being exposed. Normally, the stepper motor 192 is moved an integer number of steps, each comprising plural microsteps, to take advantage of the geometric accuracy of the pole alignment on the motor 192. However, the microstepping programming capabilities of the stepper motor allow the field location surrounding the armature to be relocated by a fraction of one pole. For example, the field location of the stepper motor positioning the optical head of the preferred printer can be relocated by the controller for the stepper motor up to 30,720 integer microstep units per millimeter of head motion. This stepping less than an integral step or stepping fewer than the number of microsteps in an integral step for the printer has been discussed as skip space stepping in the related application previously mentioned. The skip spacing step procedure can also be used to eliminate the writing dot overlap in the slow scan direction, thus reducing image stutter without changing the writing dot shape on size. Of course the dot could still be elongated to reduce the file size. Further, a combination of skip space adjustment, pixel width reduction, elongation and printing resolution changes can be performed.

If a film recorder is only occasionally used to print lenticular images, an alternate method of allowing image print files to be reduced in size, but allow the printer to use a unity aspect ratio (1:1) writing dot is by reprinting each pixel with the same information (pixel values) as the previous pixel for an integer number of times before reading a new pixel from the line buffers 134 or 136. Reprinting pixels up to 6 times when 24 images (scan lines) are provided for each lenticule would be appropriate. This technique of pixel cloning (p-cloning) in the fast scan direction repeats the fast scan pixels residing in the adapter 144 but does not repeat the scan line of pixels in the slow scan direction. In other words, the scan lines come alternately from buffers 134 and 136.

Rather than repeating the printing of pixels in the buffer to clone the pixels, it is possible to have a print file with a reduced size and to duplicate the pixels in software as the print buffers are being loaded with each scan line. For example, assume that the print file is 8000×2000 pixels where the 2000 pixel dimension is in the vertical or fast scan direction. Also assume that the printer buffers are designed for an 8000 pixel fast scan line. As each scan line is output by the computer to the printer each pixel in the fast scan direction can be duplicated or read out four times resulting in an 8000 pixel fast scan line. The preferred printer will accept one scan line in addition to the scan line being printed and print a scan lines at a rate of four scan lines per second. As a result, the computer must be able to read and duplicate pixels of the reduced size file at a rate of 32,000 pixels per second.

It should be noted that the image lines projected by a lenticule in a lenticular overlay or faceplate can be comprised of multiple scan lines. For example, if the area under a lenticule will accommodate 24 scan lines and only 12 images are used for the lenticular print, then each of the 12 image lines can be comprised of two scan lines. Of course, if 36 scan lines can be accommodated and only 12 images or views are used, each image line can be composed of three scan lines. When an image line is comprised of plural scan lines, it is desired that the scan lines which comprise an image line have the conventional slow scan overlap to maintain continuous tone values within the plural scan line image line but that the scan lines on the outside of the image line not overlap with the scan lines of adjacent image lines. In such a situation a combination of skip space adjustment with an elongated pixel can be used, as would be recognized by a person of skill in the art The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A printer for printing an image on a recording media in a manner suitable for display through a lenticular face plate attached to the media subsequent to the printing, comprising:

a media contained by the printer and having first and second directions of printing;

light beam means for modulating a light beam corresponding to ordered image data received by the printer; and an aperture intercepting the light beam and restricting a projection area of the light beam onto the media, said aperture and light beam means producing pixels on the media by modulation of the beam and restriction of the projection area, the pixels produced directly on the media having a visible overlap in the first direction and a different visible overlap in the second direction.

2. A printer as recited in claim 1, wherein said aperture and light beam means produce the pixels each having an aspect ratio of the first and second directions respectively of at least 2:1 defined by said aperture.

3. A printer for printing an image on a recording media suitable for display through a lenticular face plate, comprising:

means for directly producing modulated light beam scan lines on the media; and means for adjusting spacing of the produced scan lines to limit visible edge overlap of the scan lines.

4. A printer for printing a lenticular image on a recording media suitable for display through a lenticular face plate and responsive to image data, comprising:

a media contained by the printer;

means for producing a modulated light beam and producing scan lines having a skip space therebetween with the beam, the scan lines and skip space being produced responsive to the image data; and an aperture restricting a projection area of the beam onto the media, said aperture and beam directly exposing a pixel by modulation of the beam and restriction of the projection area, the pixel having a width to height aspect ratio of at least 1:2 defined by said aperture.

5. A printer for printing an image on a recording media suitable for display through a lenticular face plate, comprising:

a recording media contained by the printer and having a fast scan direction;

pixel means for exposing a pixel in a scan line directly on the recording media, the pixel being produced in response to a pixel print signal having pixel datum; and print control means for producing, in the fast scan direction, the print signal at least two times for each pixel datum in the scan line.

6. A method of printing an image on a recording media having fast and slow scan directions responsive to pixel data and in a manner suitable for display through a lenticular face plate attached to the media subsequent to the printing, comprising the steps of:

(a) controlling light intensity of a light beam projected onto the recording media responsive to the pixel data;

(b) scanning the light beam in a fast scan direction and in the slow scan direction as the intensity of the light beam is controlled producing pixels directly on the media; and (c) controlling the light beam to prevent visible edge overlap of the pixels in the slow scan direction as the light beam is scanned.

7. A method as recited in claim 6, wherein step (c) includes restricting a width of the light beam in the slow scan direction while the light beam is being controlled.

8. A method as recited in claim 6, wherein step (c) includes adjusting a skip space to prevent the overlap of the pixels in the slow scan direction while scanning.

9. A method as recited in claim 6, wherein a width to height aspect ratio produced by the light beam which is scanned is at least 1:2.

10. A method as recited in claim 6, wherein step (a) includes printing each of the pixels at least twice in the fast scan direction.

11. A method as recited in claim 6, wherein step (c) includes printing at a first light beam resolution in the fast scan direction and at a second light beam resolution greater than the first resolution in the slow scan direction.

12. A method of printing a depth image, comprising the steps of:

(a) reducing a diameter of a writing dot to limiting visible dot overlap; and (b) scanning the writing dot over a recording media after reducing the diameter to produce pixels directly on the recording media.

13. A method of printing a depth image with a writing dot with first and second dimensions and having first and second scan directions, comprising the steps of:

(a) elongating the first dimension of the writing dot in the first scan direction and foreshortening the second dimension of the dot in the second scan direction limiting visible scan dot overlap in the second direction; and (b) scanning the writing dot over a recording media producing pixels directly on the recording media.

14. A method of printing a depth image and having first and second scan directions, comprising the steps of:
   (a) printing directly on a media in the first scan direction at a first light beam resolution, the light beam resolution producing writing dot overlap; and
   (b) printing directly on the media in a second scan direction at a second light beam resolution less than the first resolution with a different visible writing dot overlap producing a different visible scan line overlap.

15. A method of printing a depth image having a first scan direction and a slow line scan, comprising the steps of:
   (a) printing in the first scan direction by duplicating pixels directly on a media; and
   (b) printing a different scan line in step (a) for each slow line scan.

16. A method of printing a depth image, comprising the steps of receiving image lines and printing the image lines on a recording media in a direction of printer dot motion.

17. A method as recited in claim 16, wherein said depth image is a lenticular image and further comprising the step of confronting the printer recording media with a lenticular overlay.

18. A depth image apparatus, comprising:
   a lenticular overlay having lenticules with an orientation; and
   a recording media abutting the overlay and said recording media having a fast scan direction aligned with the orientation including recorded pixels directly on the media.

19. A depth image apparatus, comprising:
   a lenticular overlay having lenticules, the lenticules being oriented during manufacture in a direction; and
   a recording media abutting the overlay, the recording media having fast scan lines recorded therein, the recording being aligned with the orientation and the scan lines not visibly overlapping.

* * * * *

UNITED STATES PATENT AND TRADEMARK OFFICE
CERTIFICATE OF CORRECTION

PATENT NO. : 5,781,225
DATED : 14 July 1998
INVENTOR(S) : Anthony Syracuse, et al It is certified that error appears in the above-identified patent and that said Letters Patent is hereby corrected as shown below:

Column 10, line 53 through -- delete claims 12-14 --
Column 11, line 1

Signed and Sealed this

Twenty-second Day of June, 1999

Attest:

Q. TODD DICKINSON

*Attesting Officer*      *Acting Commissioner of Patents and Trademarks*